United States Patent Office 3,499,148
Patented Mar. 3, 1970

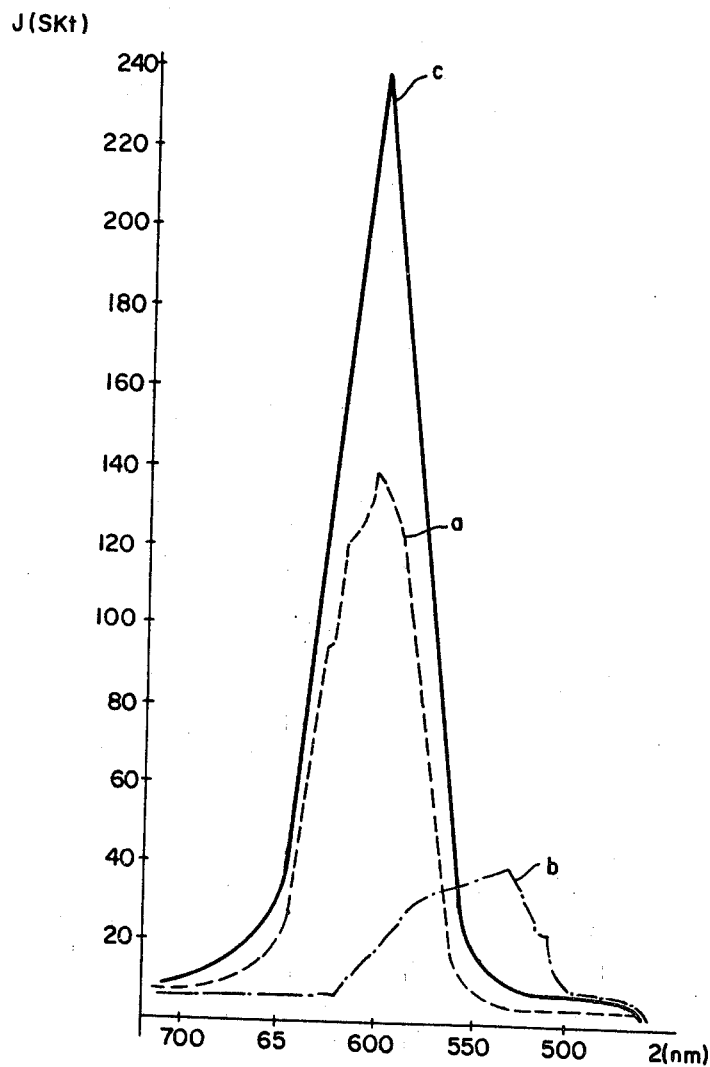

3,499,148
FERROMAGNETIC FLAW DETECTING MEDIUM WITH FLUORESCENT MATERIALS
Karl-Georg Nestler, Karl-Marx-Stadt, Peter Schultheiss, Wustenbrand, and Gunther Aurich, Karl-Marx-Stadt, Germany, assignors to Ingenieurschule fur Werksloff-technik, Karl-Marx-Stadt, Germany
Filed Jan. 20, 1967, Ser. No. 622,843
Int. Cl. G01n 21/16
U.S. Cl. 250—71       2 Claims

ABSTRACT OF THE DISCLOSURE

A ferromagnetic testing medium to be used for magnetically testing materials for the presence of cracks and the like including ferromagnetic constituents which are surrounded by a binder in which fluorescent materials are situated of which at least one under the influence of an examining light develops an emission which excites another of the fluorescent materials wherein the first mentioned fluorescent material provides an emission in an invisible ultra-violet range, the other material provides an emission in the spectral region of yellow to orange, preferably in the region of international orange.

---

This application is a continuation-in-part of copending application Ser. No. 569,894, filed Aug. 3, 1966, and entitled Ferromagnetic Testing Medium, now abandoned.

The present invention relates to ferromagnetic testing mediums.

In particular, the present invention relates to ferromagnetic testing mediums used for testing materials for the presence of cracks and the like. See, for example, U.S. Patents Nos. 1,426,384 and 2,136,375.

The ferromagnetic testing medium of the present invention includes ferromagnetic constituents which are situated in a binder, with the ferromagnetic constituents surrounded by the binder in which fluorescent materials are situated. These fluorescent materials preferably being molecularly dissolved in the binder. The use of a ferromagnetic testing medium of this type can take place with the medium in the form of a powder or suspended in a suitable carrying liquid, and the fluorescent materials have the property of responding to the examining light so as to be excited thereby to a state of emission.

It is already known to support fluorescent materials on and to combine with the ferromagnetic constituents of a testing medium of the above type. The combining of the components is brought about, for example, at least in part, by adhering fluorescent pigments by way of a suitable binder to the ferromagnetic constituents, enveloping the latter, or the fluorescent materials are molecularly or directly dissolved in a binder and together with the latter envelop the ferromagnetic constituents.

The known ferromagnetic testing mediums of the above type, which include the pigment Lumogen LT light yellow, have considerable disadvantages. These pigments are adhered by means of a lacquer to the ferromagnetic constituents. The stability of the adhering of the pigments to the ferromagnetic constituents in inadequate. During the mechanical rotary movements of the testing medium, which take place during testing of materials for cracks and the like, the pigments break away from and become loose from the ferromagnetic constituents and as the duration of the rotary movement of the testing medium increases, the proportion of non-adhering fluorescent pigments in the carrying liquid or in the examining powder increases. As a result of the presence of these unbound or non-adhering fluorescent pigments, there is provided in the examining light a highly undesirable misty, foggy type of illumination throughout the entire examining field, resulting in a reduction in the contrast between the indications of the locations of faults in the tested material and the remainder of the testing field. Thus, the lack of accuracy in the indications achieved under these conditions increases considerably.

A further drawback of the known ferromagnetic testing medium resides in the yellow-green color tone and the inadequate light intensity of the marking pigment Lumogen LT light yellow. In the yellow-green color region, as is well known, the human eye has the smallest degree of sensitivity to color contrast with respect to a dark background, while such a dark background is nevertheless essential because of the inadequate illuminating intensity of the testing medium. Under these operating conditions, optimum resolving power of the human eye, which is determined by sensitivity to contrast, cannot be achieved.

The known ferromagnetic testing mediums, where the ferromagnetic constituents are surrounded by a binder in which fluorescent materials are molecularly dissolved, do not have sufficient illuminating intensity. Furthermore, the stability of the adherence of the nitrocellulose lacquer which is used as a binder and as a carrier for the fluorescent materials is inadequate and results in the manner described above in the fogging and misting of the entire examining field. Anthracene, acetonaphthol, dibenzanthracene and other molecularly dissolvable substances are used for the molecularly dissolved fluorescent coloring materials. See for example, U.S. Patent No. 2,267,999.

A primary object of the present invention is to eliminate the above drawbacks of the testing mediums.

More specifically, it is an object of the invention to provide a fluorescent ferromagnetic testing medium which can provide a high degree of accuracy in the indicated results.

Thus, it is an object of the invention to provide a testing medium which will achieve a sufficient contrast between the indications of defects and the rest of the examining field.

Moreover, it is an object of the present invention to adapt the testing conditions to the physical properties of the human eye.

In accordance with the present invention, the testing medium, used for testing for the presence of cracks and the like in a magnetic manner, includes ferromagnetic constituents which are enveloped or surrounded by a binder in which is located, according to a particular feature of the present invention, a combination of different fluorescent materials of which at least one, when exposed to the examining light, develops an emission in the ultra violet range. This latter ultra violet emission excites at least one of the other fluorescent materials of the combination to a state of emission.

As a result of this combination of the present invention, the illuminating intensity is increased to practically double that of the known best testing mediums, so that the examining field need not be entirely darkened and at the same time there remains a sufficient contrast between the indications of faults in the tested material and the remainder of the examining field. The relatively high illuminating intensity which can be achieved with the testing medium of the invention results in the possibility of technologically favorable operating conditions which render a fully darkened working room superfluous.

The combination of the present invention operates by exciting, in response to the examining light, a primary one of the fluorescent materials to a state of emission which excites one or more of the further fluorescent materials of the combination to a state of intensified visible emission.

Furthermore, the combination of different fluorescent materials, in accordance with the present invention, enables the color tone to be adapted to the desired testing relationships.

Also, it is possible to provide combinations of fluorescent materials where between the primary or initially excited fluorescent material and the fluorescent materials which are excited to a state of emission from the emission of the primary materials there is a feedback intensification in a manner similar to the operation of feedback in high frequency electrical circuits.

It is preferred to provide the primary fluorescent material with the property of responding to excitation from the examining light in such a way as to provide an emission in the invisible ultra violet range, although it is also possible in accordance with the invention to utilize for the primary fluorescent material a substance which when exposed to the examining light will produce an emission of low intensity in the visible range.

A further improvement can be achieved by utilizing for the combination of fluorescent materials substances which in the presence of the examining light and the ultra violet light provide an emission in the spectral range of from yellow to orange, preferably, however, in international orange.

The use of an indicating color which is not green, as was customary up to the present time, but which rather is in the spectral range of yellow-orange provides the best possible adaptation of the testing procedures to the physical properties of the human eye. This feature is of considerable significance since the resolving power and thus the accuracy of the results of the test depends primarily on the sensitivity of the human eye to contrast. A reliable and rapid detection of even the smallest fault-indicating traces (for example, traces indicating the presence of hairline cracks and the like) is thus influenced primarily by the indicating color. The use of international orange, in accordance with the invention, as the indicating color provides, for testing purposes, the best possible compromise between the greatest possible sensitivity of the human eye and the best possible color contrast.

The increase in the illuminating intensity and the provision of an indicating color which corresponds to that at which the human eye has the greatest resolving power results in a substantially greater accuracy in the results of the test and thus in a greater reliability of tests carried out with the testing medium of the invention, together with an increased productivity which is achieved when using the testing medium of the present invention.

Furthermore, the accuracy of the results, which as is well known depends upon the contrast between the marks which indicate the presence of faults and the rest of the examining field, is further increased in accordance with the invention by using as a binder a known synthetic resin. Synthetic resins which are particularly suitable for these purposes are those which are brought to a state of emission in the examining light, this emission of the synthetic resin itself exciting the fluorescent materials carried by the synthetic resin to a state of emission. The synthetic resin thus operates as the primary excited fluorescent material which excites the fluorescent material which produces the indicating marks.

The synthetic resin has a greater stability of adherence to the ferromagnetic constituents, so that to a very large extent the testing medium of the invention is not influenced by stresses resulting from the rotary movements which take place during testing. Therefore, a constant indicating sensitivity is reliably achieved even during rotary movements of long duration.

It is thus possible with the testing medium of the invention to maintain at a very low level the extent of free unbound or unadhering fluorescent materials in the testing powder or in the testing liquid. As a result it is possible with the testing medium of the present invention to suppress the foggy or misty type of double-image producing illumination which results from the presence of nonadhering bodies which reduce the contrast between the indications of faults in the tested material and the remainder of the examining field.

The composition of one possible ferromagnetic testing medium in accordance with the invention is described in connection with a specific example.

The drawing illustrates graphically the relative fluorescent intensity of the fluorescent materials in the testing medium both individually and also in the combination of the present invention. The graph of the drawing which accompanies and forms part of this application shows the fluorescent intensity I in scale units plotted against the wavelength in nanometers of the emission.

In accordance with the object of achieving the greatest possible accuracy, the following testing medium has been found to combine the most favorable contrast relationships for the human eye in combination with the greatest illuminating intensity.

As fluorescent materials, Auramin Lake Yellow and Rhodamin B were used, one gram of Auramin Lake Yellow being combined with 45 mg. of Rhodamin. These materials were in a known way directly dissolved molecularly in a synthetic resin. Thereafter the ferromagnetic constituents were melted and uniformly distributed in the synthetic resin. The synthetic resin was then condensed out until the residue could effectively be worked into a condition of fine granular size, while simultaneously taking into consideration the fluorescent materials.

The above-described composition provides a testing medium whose indicating color when using ultra violet beams comes close to international orange and therefore possesses almost twice the illuminating intensity of conventional testing mediums which have fluorescent pigments in combination with ferromagnetic constituents.

The drawing graphically illustrates the operation of the fluorescent materials of the combination of invention. When the relative fluorescence of Rhodamin B dissolved in a synthetic resin and exposed to a light beam from an ultra violet source is measured at a predetermined intensity of the light, the curve $a$ results, while Auramin Lake Yellow under the same conditions develops a fluorescence in accordance with the curve $b$. However, when Rhodamin B and Auramin Lake Yellow are mixed in the abovedescribed manner, then there is provided a fluorescence according to the curve $c$, which has a substantially greater maximum value than the curves of the two constituents in their pure condition. The above relationships were achieved in a synthetic resin matrix which was the same for all tests.

The indicating color which was achieved assured a compromise between the greatest possible sensitivity of the human eye and the best possible color contrast, so as to provide optimum observation conditions. The great illuminating intensity of the testing medium permits a brightening of the testing field to facilitate the operating conditions. For example, by way of combinations of different types of Thioflavine and Rhodamine and similar fluorescent materials, every desired emission color was achieved at high light intensity, since the different fluorescent materials were chosen in such a way that each excited the other to a state of emission and an automatic self-induced intensifying of the emission was achieved.

It is also possible to use a fluorescent color material combination composed of 1 gram of brilliant sulfoflavin, which is seeded with 35 milligrams of Rhodamin B, so as to form the mixture.

In order to achieve the optimum properties of the resin and the fluorescent properties of the color material which is molecularly dissolved in the resin, it is necessary, when making use of poly condensate resins, to control the condensation with particularly great care. The condensation temperature should not exceed 120° C, and the condensation should not take place over a period of time longer than 5 hours, calculated from the time when the coloring material is added until the cooling of the synthetic resin. The condensation of the resin is to be controlled in such a way that when the separation of water ends, a temperature drop immediately follows.

If care is not exercised in carrying out this procedure, there will be a decomposition of the resin and the coloring material to an increasing degree, and this decomposition will be particularly favored by the fact that there is in the testing medium magnetite which acts as a catalyst. As a result of the decomposition there is a reduction in the fluorescence and in the indicating accuracy of the testing medium.

As synthetic resins it is suitable to use especially an op - toluol - sulfonamide-melamine-p-formaldehyde-condensation product, to which a portion of hydroquinone is added as a reduction medium during condensation.

Almost the same properties, with respect to light power, can also be achieved with the nitro-combination lacquer resin "Ceraval," manufactured by the firm Kerckhoff & Harzer, Dresden.

For ferromagnetic particles, it is preferred to use magnetite having very small grain size. The type of magnetite which is used in the manufacture of sound recording tapes has proved to be particularly suitable. As corresponding ferromagnetic components the following magnetites are used: Type C, Type CH and CR of the film manufacturing plant Wolfen, of Germany, although grain sizes which are generally smaller than 1 m$\mu$ are essential.

Besides the above-mentioned magnetites, all magnetites are suitable which are derived from other firms, as long as they have a high initial permeability and relative remanence and a corresponding small grain size.

The foregoing disclosure relates only to preferred embodiments of the invention which is intended to include all changes and modifications of the examples described within the scope of the invention as set forth in the appended claims.

What is claimed is:

1. A ferromagnetic testing medium to be used for magnetically testing materials for the presence of cracks and the like, said testing medium comprising ferromagnetic particles which are surrounded by a binder in the form of a synthetic resin in which fluorescent materials are molecularly dissolved, said fluorescent materials including a combination of different fluorescent materials of which at least one when exposed to an examining light, develops a primary emission in the range of ultra-violet light which excites another of the fluorescent materials of the combination to provide a secondary emission in the range of orange light.

2. The combination of claim 1 and wherein said synthetic resin when exposed to the examining light itself is excited to a state of emission, and said emission of said synthetic resin exciting to a state of emission at least one of the fluorescent materials carried by the synthetic resin.

References Cited
UNITED STATES PATENTS

| | | | |
|---|---|---|---|
| 2,765,411 | 10/1956 | Kerr | 250—71 |
| 2,920,203 | 1/1960 | Switzer et al. | |
| 3,341,010 | 9/1967 | Switzer. | |

ARCHIE R. BORCHELT, Primary Examiner